(12) United States Patent
Woelfing et al.

(10) Patent No.: US 11,246,194 B2
(45) Date of Patent: Feb. 8, 2022

(54) DRIVER CIRCUIT WITH A SEMICONDUCTOR LIGHT SOURCE AND METHOD FOR OPERATING A DRIVER CIRCUIT

(71) Applicant: SCHOTT AG, Mainz (DE)

(72) Inventors: Bernd Woelfing, Mainz (DE); Andreas Hatzenbuehler, Neu-Bamberg (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/044,052

(22) Filed: Jul. 24, 2018

(65) Prior Publication Data

US 2018/0332683 A1 Nov. 15, 2018

Related U.S. Application Data

(63) Continuation of application No. 14/553,953, filed on Nov. 25, 2014, now abandoned.

(30) Foreign Application Priority Data

Nov. 26, 2013 (DE) .......................... 102013113053.4

(51) Int. Cl.
*H05B 45/12* (2020.01)
*H05B 45/325* (2020.01)
*H05B 47/11* (2020.01)

(52) U.S. Cl.
CPC ........... *H05B 45/12* (2020.01); *H05B 45/325* (2020.01); *H05B 47/11* (2020.01)

(58) Field of Classification Search
CPC ........... H05B 33/0815; H05B 33/0818; H05B 33/0851; H05B 33/0803; H05B 45/10; H05B 45/32; H05B 45/325; H05B 47/10; H05B 47/11

USPC .......................... 315/291, 294, 152, 307, 224
See application file for complete search history.

(56) References Cited

U.S. PATENT DOCUMENTS

| | | | | |
|---|---|---|---|---|
| 3,785,721 A * | 1/1974 | Harsch | ................... | G02F 1/1393 349/33 |
| 6,093,926 A * | 7/2000 | Mertins | ................... | A01C 7/105 250/222.1 |
| 6,441,558 B1 * | 8/2002 | Muthu | ................... | H05B 45/20 315/149 |
| 6,498,440 B2 * | 12/2002 | Stam | ...................... | H05B 45/37 315/291 |
| 6,614,358 B1 * | 9/2003 | Hutchison | ............... | G08G 1/095 340/815.45 |
| 6,630,801 B2 * | 10/2003 | Schuurmans | .......... | H05B 45/22 315/307 |

(Continued)

FOREIGN PATENT DOCUMENTS

DE 10349553 1/2005
DE 102006020839 11/2007

(Continued)

*Primary Examiner* — Abdullah A Riyami
*Assistant Examiner* — Syed M Kaiser
(74) *Attorney, Agent, or Firm* — Ohlandt, Greeley, Ruggiero & Perle, L.L.P.

(57) ABSTRACT

A driver circuit for a semiconductor light source and to a method for controlling the brightness thereof are provided. When a pulse width modulated semiconductor light source reaches a duty cycle threshold value, the voltage is increased or decreased through a variable voltage source in order to achieve a higher dynamic range.

20 Claims, 4 Drawing Sheets

(56) References Cited

U.S. PATENT DOCUMENTS

| | | | |
|---|---|---|---|
| 7,173,383 B2* | 2/2007 | Vornsand | F21S 4/28 315/291 |
| 7,256,557 B2* | 8/2007 | Lim | G09G 3/3426 315/312 |
| 8,344,663 B2 | 1/2013 | Trattler | |
| 8,358,263 B2* | 1/2013 | Ng | H05B 45/20 345/102 |
| 9,226,367 B1* | 12/2015 | Sivertsen | H05B 45/37 |
| 9,313,855 B1* | 4/2016 | Sivertsen | H05B 45/46 |
| 2003/0214242 A1* | 11/2003 | Berg-johansen | H05B 45/10 315/169.3 |
| 2005/0099319 A1* | 5/2005 | Hutchison | H05B 45/37 340/908 |
| 2005/0110984 A1* | 5/2005 | Merz | G01J 1/26 356/218 |
| 2005/0280375 A1 | 12/2005 | Chikugawa | |
| 2006/0097765 A1* | 5/2006 | Asada | H03K 7/08 327/172 |
| 2006/0097978 A1* | 5/2006 | Ng | G09G 3/3413 345/102 |
| 2006/0109389 A1* | 5/2006 | Ichikawa | G09G 3/342 349/1 |
| 2007/0080905 A1* | 4/2007 | Takahara | G09G 3/3258 345/76 |
| 2007/0108846 A1 | 5/2007 | Ashdown | |
| 2007/0115228 A1* | 5/2007 | Roberts | G09G 3/3413 345/82 |
| 2007/0115248 A1* | 5/2007 | Roberts | H05B 45/00 345/102 |
| 2007/0171670 A1 | 7/2007 | Zagar | |
| 2007/0247414 A1* | 10/2007 | Roberts | G09F 9/3026 345/102 |
| 2008/0048582 A1* | 2/2008 | Robinson | H05B 45/20 315/291 |
| 2008/0094005 A1* | 4/2008 | Rabiner | H05B 47/18 315/294 |
| 2009/0021178 A1* | 1/2009 | Furukawa | G09G 3/3413 315/250 |
| 2009/0189842 A1* | 7/2009 | Huang | G09G 3/342 345/102 |
| 2009/0207123 A1* | 8/2009 | Kim | G09G 3/3406 345/102 |
| 2009/0251068 A1* | 10/2009 | Holec | F21V 23/005 315/294 |
| 2010/0011856 A1* | 1/2010 | Nagata | G01P 15/08 73/504.12 |
| 2010/0070221 A1* | 3/2010 | Altimus | G01R 31/31708 702/66 |
| 2010/0296285 A1* | 11/2010 | Chemel | H05B 47/12 362/235 |
| 2010/0327764 A1* | 12/2010 | Knapp | H05B 47/11 315/250 |
| 2010/0328766 A1* | 12/2010 | Griffin | G02B 21/06 359/387 |
| 2011/0080110 A1* | 4/2011 | Nuhfer | H05B 45/37 315/291 |
| 2011/0187517 A1* | 8/2011 | Roths | H05B 47/10 340/432 |
| 2011/0227496 A1* | 9/2011 | Lin | H05B 45/10 315/209 R |
| 2011/0248640 A1* | 10/2011 | Welten | H05B 45/3575 315/210 |
| 2011/0279057 A1* | 11/2011 | Briggs | H05B 47/175 315/294 |
| 2012/0153828 A1* | 6/2012 | Gordin | H05B 47/10 315/86 |
| 2012/0169240 A1* | 7/2012 | Macfarlane | H02M 1/083 315/152 |
| 2012/0206064 A1* | 8/2012 | Archenhold | H05B 45/395 315/297 |
| 2012/0206427 A1* | 8/2012 | Yamamuro | H05B 45/37 345/207 |
| 2012/0217889 A1* | 8/2012 | Jayabalan | H05B 45/14 315/209 R |
| 2012/0218787 A1* | 8/2012 | Fan | H02M 3/33523 363/21.15 |
| 2012/0235579 A1* | 9/2012 | Chemel | H05B 45/10 315/152 |
| 2013/0141635 A1* | 6/2013 | Lebens | F21L 4/027 348/370 |
| 2013/0193879 A1* | 8/2013 | Sadwick | H05B 45/3725 315/307 |
| 2013/0201316 A1* | 8/2013 | Binder | H04L 67/12 348/77 |
| 2013/0320862 A1* | 12/2013 | Campbell | H05B 45/50 315/152 |
| 2014/0028198 A1* | 1/2014 | Reed | H05B 47/16 315/152 |
| 2014/0038777 A1* | 2/2014 | Bird | A63B 21/151 482/5 |
| 2014/0043006 A1* | 2/2014 | Tan | H02M 3/157 323/298 |
| 2014/0091723 A1* | 4/2014 | Kuo | H05B 45/14 315/200 R |
| 2014/0201851 A1* | 7/2014 | Guo | G06F 1/26 726/34 |
| 2014/0225507 A1* | 8/2014 | Hasegawa | H05B 45/00 315/117 |
| 2014/0239810 A1* | 8/2014 | Martin-Lopez | H05B 45/37 315/85 |
| 2015/0022103 A1* | 1/2015 | Kao | H05B 45/37 315/192 |
| 2015/0115809 A1* | 4/2015 | Siessegger | H05B 33/0803 315/185 R |
| 2015/0115816 A1* | 4/2015 | Bradford | H05B 45/48 315/192 |
| 2015/0116567 A1* | 4/2015 | Gossage | H04N 5/37455 348/311 |
| 2015/0145417 A1* | 5/2015 | Woelfing | H05B 45/325 315/151 |

FOREIGN PATENT DOCUMENTS

| | | |
|---|---|---|
| DE | 102010002072 | 8/2011 |
| DE | 102010013379 | 10/2011 |
| DE | 102011089885 | 6/2013 |
| DE | 102012101255 | 8/2013 |
| WO | 2008104228 | 9/2008 |
| WO | 2011114250 | 9/2011 |

* cited by examiner

DRIVER CIRCUIT WITH A SEMICONDUCTOR LIGHT SOURCE AND METHOD FOR OPERATING A DRIVER CIRCUIT

CROSS-REFERENCE TO RELATED APPLICATIONS

This application is a continuation under 35 U.S.C. § 120 of U.S. application Ser. No. 14/553,953 filed on Nov. 25, 2014, which claims benefit under 35 U.S.C. § 119 of German Patent Application No. 10 2013 113 053.4, filed Nov. 26, 2013, the entire contents of both of which are incorporated herein by reference.

BACKGROUND

1. Field of the Invention

The invention relates to a driver circuit with a semiconductor light source, in particular a driver circuit for a light emitting diode (LED). More particularly, the invention relates to a driver circuit used for color controlled LED light sources.

2. Description of Related Art

Driver circuits for semiconductor light sources, especially for light emitting diodes, have been known. In particular color controlled light sources are available. For controlling the brightness and color of such light sources, a driver circuit is advantageous which is capable to adjust the electric power at the light emitting diode over a range of five orders of magnitude.

Pulse width modulation has been found particularly suitable for the power control of light emitting diodes, since it permits to achieve a nearly constant wavelength and an almost linear behavior in brightness. By contrast, an adjustment through the current is complex and is moreover usually quite inaccurate because of the steep diode characteristic and the non-linear relationship between current density and brightness.

However, an adjustment through the pulse width is limited. Very short pulses are difficult to achieve in pulse width modulation, and moreover they affect EMC behavior.

However, an extension of the pulse intervals is only possible to a limited extent, since otherwise the distance between the individual pulses is so long that the human eye will perceive a flicker. A consequence thereof is that with a conventional pulse width modulated control the electric power at the LED can usually only be adjusted over a range of about three orders of magnitude.

Published patent application WO 2011/114250 A1 describes powering an LED through a power source. When due to dimming the current falls below a minimum required current value, the current is kept constant and a pulse width modulated control is then used. This is associated with an extended dynamic range which is now only a result of the dynamic range of the power source and of the pulse width modulated signal. However, the dynamic range of typical power sources is limited to 2 to 3 orders of magnitude, since accurate and at the same time efficient measurement of large and small currents is only feasible to a limited extent.

Furthermore, it is conceivable to control the LED current through a step-down converter. Step-down converters are electrically rather efficient but not designed to provide very small currents as compared to the maximum current, so that the dynamic range of a step-down converter is limited to one to two orders of magnitude.

Moreover, current control relies on a sensing resistor which, if it is small provides only very small signals at low currents, or, if it is large leads to severe loss in efficiency in case of large currents.

A voltage-based adjustment of the power of an LED is usually not made, due to the steep diode characteristic, except maybe with very simply designed circuits. In this case the LED is connected to a relatively large series resistor, so that the diode characteristic is flattened by the superimposed characteristic in a manner so that the current can be adequately controlled through the voltage. However, such a circuit is inefficient.

Another possibility is to adjust the voltage through connectable series resistors. However, with the number of required brightness levels increasing, the number of required resistors also increases, and moreover the maximum brightness is quite limited since the behavior of the current-voltage characteristic is rather inaccurate. In order to avoid excessive currents which would reduce the lifetime of the LED, it is therefore necessary to choose a large series resistor.

SUMMARY

Therefore, the invention is based on the object to mitigate the drawbacks of the prior art.

More particularly, an object of the invention is to provide a driver circuit of a simple configuration, which permits to precisely control the light output of a light emitting diode over a wide range.

The object of the invention is achieved by a driver circuit with a semiconductor light source and by a method for operating a driver circuit with a semiconductor light source.

The invention relates to a driver circuit with a semiconductor light source. More particularly, the invention relates to a driver circuit for light emitting diodes (LEDs).

Preferably the invention is used for color controlled LEDs. These especially include so-called RGB LEDs which emit light in three different colors to be mixed. Such LEDs permit to efficiently generate light of a desired light color, in particular white light, for example.

However, a prerequisite for this is a precise control of the luminous intensities of the individual light colors, since even small differences in light output will result in a different color appearance, which is a disadvantage especially when several of such controlled light sources are arranged side by side.

The semiconductor light source is driven through pulse width modulation. That means, a pulse width modulated signal is applied to the light source, preferably a square-wave signal, and the light is adjusted through the duty cycle, i.e. the ratio of pulse width to pulse interval.

The driver circuit comprises at least one sensor which can be used to measure the luminous intensity of the light emitted by the semiconductor light source.

So this sensor measures the brightness of the semiconductor light source, directly or indirectly.

If a plurality of semiconductor light sources are provided, it is also possible to measure the brightness of each light source using a single sensor, by determining the brightness by means of the sensor during the pulse intervals of the other semiconductor light sources.

The sensor is connected to a controller. In particular a microcontroller is used as the controller.

The controller, in turn, controls the luminous intensity of the semiconductor light source by adjusting the duty cycle of the pulse width modulation.

It will be understood that the pulse width modulator may be part of the controller.

According to the invention, the semiconductor light source is powered by a variable voltage source, and the variable voltage source is controllable by the controller in a manner so that the voltage applied to the semiconductor light source is adjustable via the controller when the duty cycle falls below or exceeds a threshold value.

Here, a variable voltage source does not only refer to a voltage source for outputting a controlled voltage that is defined by an input signal.

It may also comprise a fixed voltage source in series with an adjustable resistor, for example. In such a system the resistor is selectively varied by an input signal. However, the effective output voltage depends on the properties of the downstream circuit. Therefore, a variable voltage source refers to a circuit unit which supplies a downstream circuit unit with an effective voltage, wherein the effective voltage may be increased or decreased in suitable increments or continuously in response to an input signal to the voltage source.

According to the invention, therefore, in order to increase the dynamic range, the voltage is reduced by the controller when a minimum value of the duty cycle is reached, for example when the duty cycle falls below 10%, so that the pulse widths may be increased in turn.

A determination of the applied voltage or current is not necessary, since the brightness of the LED will continue to be accurately controlled by the pulse width modulation.

Preferably, current or voltage control is dispensed with. So there will be no control loop controlling the current in a rather complex way or controlling the voltage in a somewhat less complex, but still complex way. Rather, an unregulated control element is sufficient, through which the voltage is varied.

It will be understood that with this unregulated driving of a control element the voltage source may also be considered as a current source, since in an electric circuit an applied voltage is always associated with a current.

The control circuit of the voltage source is therefore indeterminate. In the context of the invention, the voltage is furthermore dependent on the operating point of the electrical components used. The voltage may vary, in particular due to thermal effects, without this having any effect on the control according to the invention.

In contrary, the avoidance of a current or voltage control is rather beneficial for the control according to the invention, since brightness control is accomplished indirectly via PWM control which permits to increase or decrease the voltage when a threshold value is reached without a need to apply a defined voltage.

In particular no sensing resistor for current control purposes is required.

However, it may be advantageous if a table of values is stored in a memory of the controller, which represents the approximate ratio of applied voltage to brightness.

By accessing the table of values, when raising or lowering the voltage applied to the semiconductor light source the controller can increase or decrease the duty cycle accordingly, so that upon switching the brightness remains essentially the same.

It will be understood that due to the steep diode characteristic the brightness will usually still change, however this can be corrected so quickly by the pulse width modulated control, already at the first pulse or first several pulses, that an alteration in brightness will not be visible for the viewer.

In a preferred embodiment of the invention, a variable resistor is provided for controlling the voltage, which can be driven by the controller. In particular a digitally variable resistor is used, which is available as an integrated circuit and which can be directly controlled by the digital controller and may optionally be integrated into the controller, which is provided in form of a microcontroller.

Furthermore, the variable voltage source may comprise a transistor, in particular a field effect transistor, more particularly a MOSFET, which can be driven by the controller.

In fact a field effect transistor is usually rather inaccurate, but according to the invention this is compensated for in a very simple manner by the pulse width modulation. A significant advantage of a field effect transistor, besides its availability at a low price, is that it usually has a low resistance. By using a field effect transistor which changes resistance and hence the voltage as a function of the voltage applied to the gate, it is possible to produce such a circuit at low costs and at the same time to provide for a high efficiency.

The use of a bipolar transistor may also be contemplated, for example. The latter exhibits higher power loss than a field effect transistor, and therefore, according to the invention, it may rather be used to control relatively low powers.

Furthermore, it is conceivable to use a clocked voltage converter which is controlled through the clock rate. An appropriate PWM signal for varying the clock rate may be supplied from the controller. It will be understood that this PWM signal does not correspond to the PWM signal for the LED. A field effect transistor may also be adjusted incrementally using a digital signal, in particular an 8 bit signal from the controller, specifically 256 resistance values can be set using an 8 bit signal.

Alternatively, a series of resistors may be employed, each of which may be bypassed independently by a switch and which add up to a total resistance.

It will be understood that the voltage of the variable voltage source need not be the only voltage applied to the semiconductor light source. Rather, it is conceivable to apply a first voltage to the semiconductor light source, which is constant and thus defines the minimum voltage. The voltage controlled through the controller is added and applied to the semiconductor light source.

The voltage source is preferably adjustable incrementally.

In a preferred embodiment of the invention, the variable voltage source is adjustable in at least 5, preferably at least 10, and more preferably at least 100 increments.

To prevent unnecessarily frequent switching between different voltage ranges, the incremental steps of the voltage levels and the tolerance ranges of the PWM are selected such that the expected change in current causes that the new PWM ratio is again in the center of the tolerance range.

The voltage change required for this purpose can be seen from the data sheets of the semiconductor light source, or can be measured. It will usually not be constant over the entire range within which the voltage is varied. The required resistance levels may be calculated from the required voltage levels for the semiconductor light source and the base voltage of the voltage source.

For example, if the tolerance range for the PWM duty cycle is chosen to be from 30% to 90%, it follows that a factor of $(90\%/30\%)\textasciicircum-2\sim1.7$ causes that when switching the current level at the threshold, a new operating point is set at a duty cycle of about 52%. This duty cycle will then again be offset from the lower or upper thresholds by a factor of 1.7. The current increment can be chosen larger if it is known that continuous brightness ramps are to be driven frequently during operation. In this case, when the brightness is continuously raised and the maximum duty cycle it reached, the current will be reduced by a factor of 2.5, for example, in the above example. This will reduce the duty cycle to about 35%, so that when further raising the brightness the next incremental switching of the level will be required later than with a factor of 1.7. A similar consideration applies when decreasing along a brightness ramp.

If, for example, the voltage is reduced due to a low duty cycle, then a re-increase in voltage will only be caused when the associated duty cycle is significantly higher.

The invention further relates to a method for operating a driver circuit of a semiconductor light source, wherein the semiconductor light source is driven by pulse width modulation and the luminous intensity of the light emitted from the semiconductor light source is sensed by a sensor.

The sensor is connected to a controller which controls the duty cycle and thus the luminous intensity.

According to the invention, the semiconductor light source is powered by a variable voltage source which is also controlled by the controller, and when the duty cycle falls below or exceeds a duty cycle threshold value, the voltage applied to the semiconductor light source is increased or decreased by the controller by driving the variable voltage source.

Preferably, the voltage applied to the semiconductor light source is reduced at a duty cycle of less than 30%, preferably less than 20%, in order to be capable to return to higher duty cycle values.

Furthermore, it is conceivable to increase the voltage at a duty cycle of more than 70%, preferably more than 80%, in order to be capable to return to lower duty cycle values.

The method may be used to dim a single semiconductor light source. Preferably, however, the method is used for controlling the brightness of light emitting devices that comprise light emitting diodes of different colors.

DETAILED DESCRIPTION

The subject matter of the invention will now be described by way of schematically illustrated exemplary embodiments and with reference to the drawings of FIGS. 1 to 4.

Figure 1:
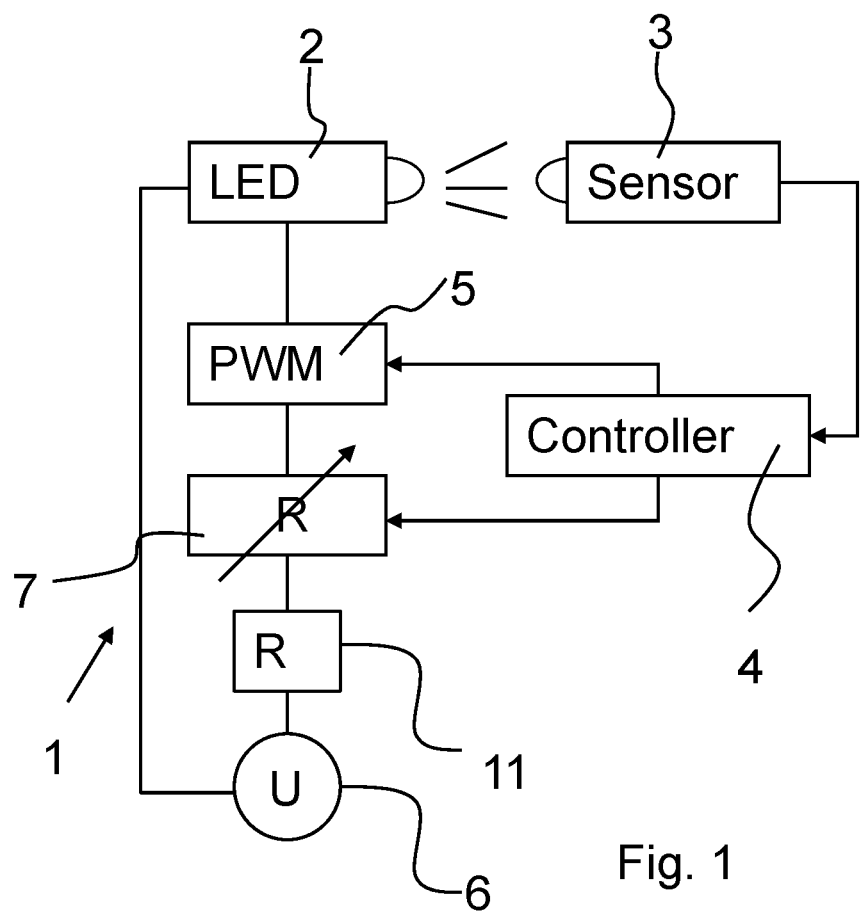
FIG. 1 schematically illustrates a first embodiment of the invention.

FIG. 1 schematically illustrates a first embodiment of the invention.

A driver circuit 1 is shown comprising a light emitting diode 2.

The light emitted by light emitting diode 2 is detected by a sensor 3, for example a photodiode.

Sensor 3 is connected to a controller 4, which preferably is configured as a microcontroller.

Light emitting diode 2 is driven by pulse width modulation. For this purpose, a pulse width modulator 5 is provided which is controlled by controller 4.

It will be understood that the controller 4 may be connected to external control means (not shown), via which it receives a signal which represents a desired color of light (when integrated in a brightness control with a plurality of differently colored LEDs) and/or a desired brightness.

Light emitting diode 2 is powered by a voltage source 6. It will be understood that the voltage source 6 may also supply a voltage (not shown) for controller 4 or sensor 3.

According to the invention, a variable resistor 7 is provided, which is also controlled by controller 4. Through variable resistor 7, the voltage applied at pulse width modulator 5 can be increased or decreased.

Controller 4 is not connected to a sensing resistor for sensing the current applied to the LED. Rather, it suffice to increase or decrease the applied voltage by varying variable resistor 7. Variable resistor 7 is preferably provided in form of an integrated circuit and is digitally controlled.

For example, if the duty cycle is 75% while sensor 3 signals the controller 4 that the current brightness is only 0.6 times of the currently desired brightness, the duty cycle required—in a simplified linear approximation—would be 75%/0.6=125%, which is not possible.

The controller now reduces the resistance of resistor 7 by one increment thereby increasing brightness by 30%, for example. Therefore, the duty ratio may also be reduced by 30%.

This may be accomplished using a table of values which, however, usually will not lead to the exact desired brightness but to a substantial approach. Finally, the brightness will then be adjusted exactly through the pulse width modulation.

The voltage may preferably controlled incrementally, and in a preferred embodiment of the invention when changing the voltage from level to level the brightness changes by less than a factor of 4, preferably by less than a factor of 2.

The circuit may comprise an invariable series resistor 11 to safely limit the maximum current.

Figure 2:
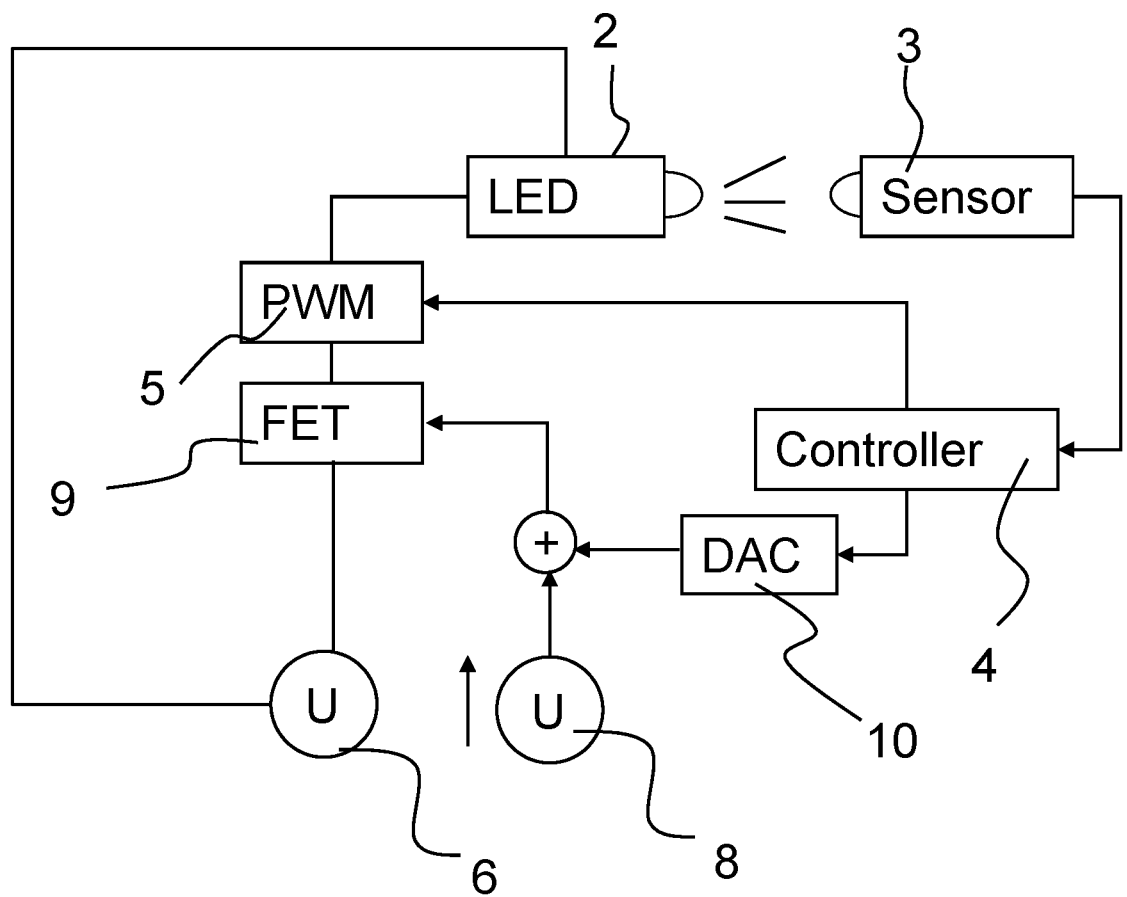
FIG. 2 shows another exemplary embodiment of the invention, which corresponds to the basic concept of FIG. 1.

FIG. 2 shows another exemplary embodiment of the invention, which corresponds to the basic concept of FIG. 1.

Again, a driver circuit 1 is provided, with a light emitting diode 2 whose luminous intensity is measured by a sensor 3 and whose light output is controlled by a controller 4 by driving a pulse width modulator 5.

Again, only a single light emitting diode is shown, whereas in a preferred embodiment of the invention a plurality of light emitting diodes are controlled. For this purpose, the controller 4 would independently control a plurality of light emitting diodes in different colors.

It is even possible to sense the light from a plurality of light emitting diodes at the same time using a single sensor, by having the sensor determining a respective brightness during the pulse intervals of the other light emitting diodes. If always at least two light emitting diodes are turned on, this determination may be made by addition and subtraction.

Furthermore, it is conceivable to measure the brightness of different colors of light by differently configured sensors, for example sensors comprising a color filter.

Controller 4 is connected to the gate of a field effect transistor 9. In this case the digital signal of controller 4 is converted into an analog voltage signal, by an internal or external DAC 10. This voltage is used to adjust the effective resistance of FET 9 between source and drain.

The voltage applied to LED 2 and the current flowing through LED 2 are a result of the voltage from the voltage source, the effective resistance of FET 9, and the current-voltage characteristic of LED 2.

However, measuring or closed loop control of the current or voltage is not necessary in this case. It must only be ensured, by a lower limit of the effective resistance, that the maximum current allowable at the LED 2 is not exceeded. This may be accomplished by previous calculation considering the tolerances of the device, in particular of the LED, or by calibration.

Furthermore, the circuit may be designed so that the variable voltage at the gate is superimposed by a base voltage of a second voltage source 8 which is not sufficient for through-connecting the FET 9. In this manner, the entire dynamic range of the DAC 10 may be used for controlling the resistance.

Moreover, a further ohmic resistor (not shown) may be connected in series with the FET 9, similar to the illustration in FIG. 1, which limits the current to the maximum permissible current through LED 2, even in a fully through-connected state of FET 9. This increases the safety of the circuit.

Otherwise, the circuit in which FET 9 supplies a voltage to the LED via pulse width modulator 5 substantially corresponds to FIG. 1.

The use of a field effect transistor 9 provides for a particularly simple digital voltage control.

Figure 4:
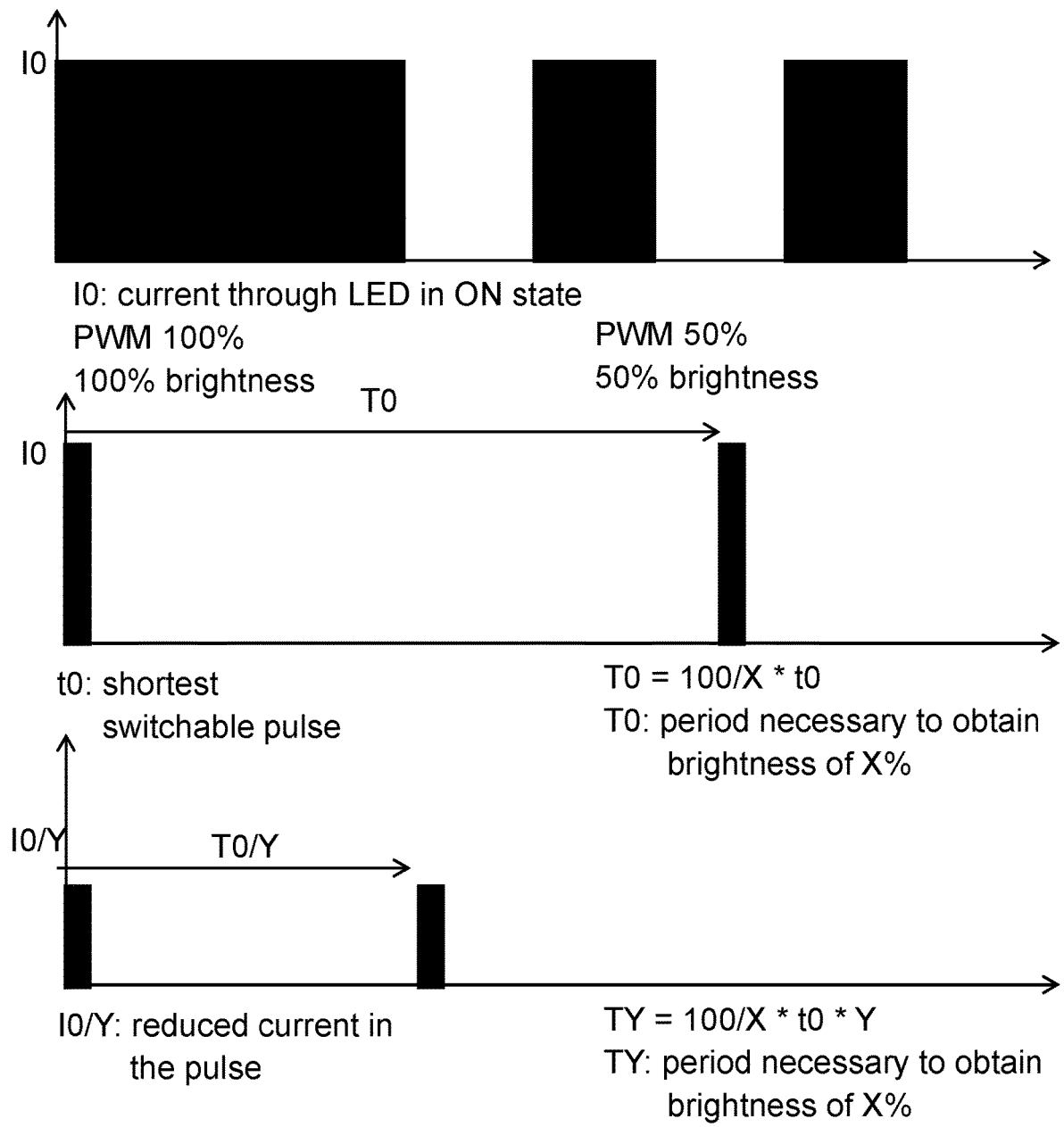
FIG. 4 shows the interaction of the pulse width modulated control with the voltage control.

Referring to FIG. 4, the interaction of the pulse width modulated control with the voltage control will now be described.

The voltage should be varied in such a manner that when a threshold value is reached, the power at the LED is approximately in a central region of the pulse width modulation control. If the change in voltage is too large this could cause a switching back and forth between voltages, and if the change in voltage is too small this might cause the PWM control to permanently remain near the thresholds.

Figure 3:
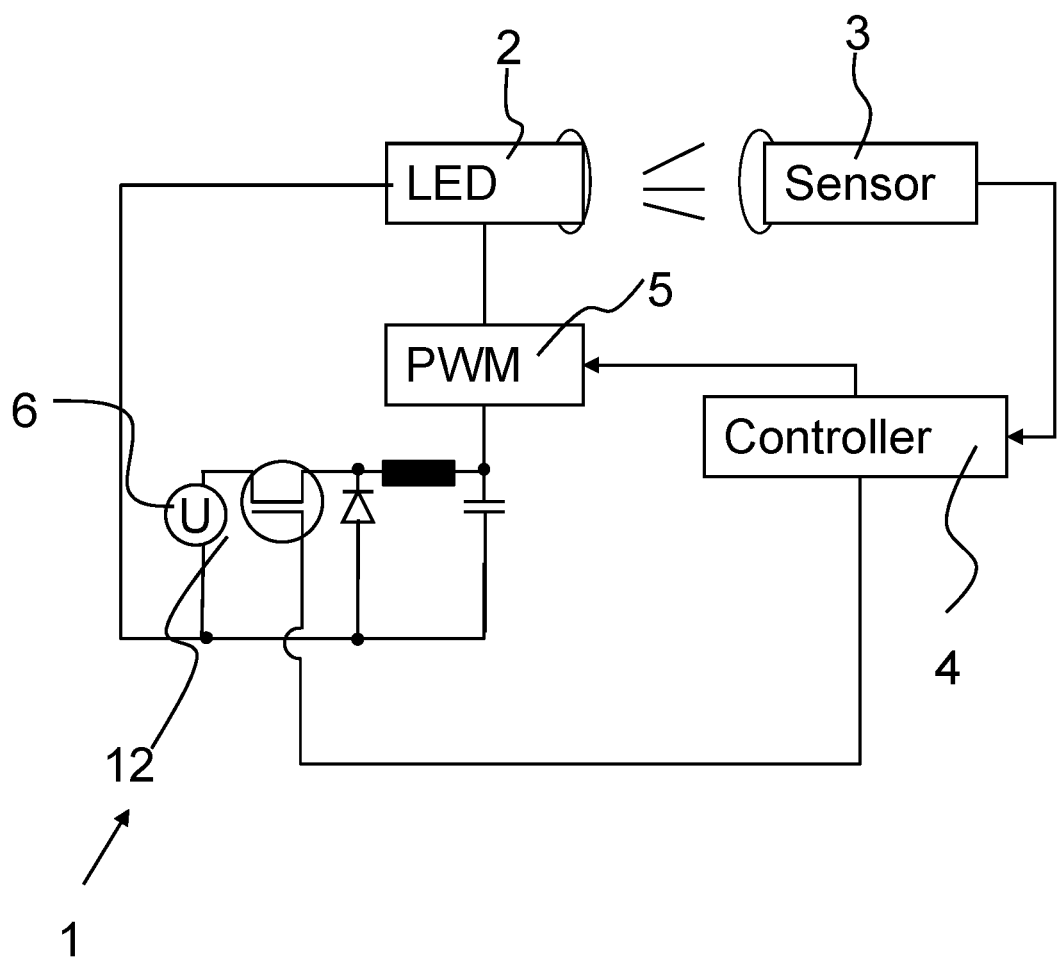
FIG. 3 shows a circuit diagram of a further embodiment of the invention.

FIG. 3 shows the circuit diagram of a further embodiment of the invention in which a clocked converter 12, in particular a buck, boost, SEPIC or step-down converter is used. Converter 12 comprises a field effect transistor which has a pulse width modulated signal from controller 4 applied to the gate thereof.

This pulse width modulated signal which does not correspond to the pulse width modulated signal of pulse width modulator 5 can be used to vary the voltage in the circuit that includes pulse width modulator 5 and LED 2.

Controller 4 is again connected to sensor 3 and calculates a first signal for driving the pulse width modulator, and a second, pulse width modulated signal which is applied to the gate of the field effect transistor of converter 12.

FIG. 4 shows, on the top, a pulse width modulated signal which initially has a duty cycle of 100% which is associated with a brightness of 100%.

Further to the right, the duty cycle is reduced to 50% corresponding to a brightness of 50%.

The coordinate system in the middle shows the shortest switchable pulse at t0. It can be seen here, that for the exemplified light output and the associated duty cycle the pulse interval to the next pulse is very long. This may be accompanied by a flickering of the light emitting diode.

According to the invention, now, as shown in the coordinate system on the bottom, the voltage is reduced and hence the current flowing through the light emitting diode, too. Now, with the same pulse width a substantially shorter pulse interval is required in order to obtain the same brightness.

The invention permits to control LEDs, in particular RGB or RGBW LEDs, with a higher dynamic range.

LIST OF REFERENCE NUMERALS

1 Driver circuit
2 Light emitting diode
3 Sensor
4 Controller
5 Pulse width modulator
6 Voltage source
7 Variable resistor
8 Voltage source
9 Field effect transistor
10 Digital-to-analog converter
11 Resistor
12 Converter

What is claimed is:

1. A driver circuit with a semiconductor light source, comprising:
    at least one pulse width modulation driven semiconductor light source;
    at least one sensor measuring a luminous intensity of light emitted by the semiconductor light source;
    a variable voltage source powering the semiconductor light source; and
    a controller connected to the at least one sensor and the variable voltage source, the controller controlling the luminous intensity of the light emitted by the semiconductor light source by adjusting a duty cycle of the pulse width modulation, and the controller controlling the variable voltage source such that, when the duty cycle falls below or exceeds a duty cycle threshold value outside a desired range, a voltage, and thereby an on-current during the duty cycle, applied to the semiconductor light source is adjusted by the controller through the variable voltage source without a sensing resistor.

2. The driver circuit as claimed in claim 1, wherein the variable voltage source comprises a variable resistor controlled by the controller.

3. The driver circuit as claimed in claim 1, wherein the variable voltage source comprises a field effect transistor controlled by the controller.

4. The driver circuit as claimed in claim 1, wherein the variable voltage source comprises an unregulated control element, through which the voltage can be varied.

5. The driver circuit as claimed in claim 1, wherein the controller comprises a memory that stores a table of values representing a ratio of applied voltage and brightness so that when raising or lowering the voltage applied to the semiconductor light source the controller can increase or decrease the duty cycle based on the table to keep the brightness essentially the same upon switching.

6. The driver circuit as claimed in claim 1, wherein the variable voltage source is adjustable in at least 5 increments.

7. The driver circuit as claimed in claim 1, wherein the variable voltage source is adjustable in at least 10 increments.

8. The driver circuit as claimed in claim 1, wherein the variable voltage source is adjustable in at least 100 increments.

9. A method for operating a driver circuit for a semiconductor light source, comprising:
    driving at least one semiconductor light source through pulse width modulation;

sensing a luminous intensity of light emitted by the semiconductor light source;
adjusting a duty cycle of the pulse width modulation based on the sensed luminous intensity;
powering the semiconductor light source by a variable voltage source;
controlling, without a sensing resistor, the variable voltage source, when the duty cycle falls below or exceeds a duty cycle threshold value outside a desired range, to increase or decrease a voltage and thereby an on-current during the duty cycle applied to the semiconductor light source.

10. The method as claimed in claim 9, wherein the voltage applied to the semiconductor light source is reduced in case of a duty cycle of less than 30%.

11. The method as claimed in claim 9, wherein the voltage applied to the semiconductor light source is reduced in case of a duty cycle of less than 20%.

12. The method as claimed in claim 9, wherein the voltage applied to the semiconductor light source is increased in case of a duty cycle of more than 70%.

13. The method as claimed in claim 9, wherein the voltage applied to the semiconductor light source is increased in case of a duty cycle of more than 80%.

14. The method as claimed in claim 9, wherein the step of driving at least one semiconductor light source through pulse width modulation comprises driving a plurality of semiconductor light sources, each of the plurality of semiconductor light sources having a different color of light.

15. The method as claimed in claim 14, further comprising adjusting the duty cycle of the pulse width modulation based on the sensed luminous intensity separately for each color.

16. A driver circuit with a semiconductor light source, comprising:
the semiconductor light source;
a pulse width modulator;
a voltage source in communication with the semiconductor light source via the pulse width modulator;
a sensor measuring a luminous intensity of light emitted by the semiconductor light source; and
a controller in communication with the sensor and the pulse width modulator, the controller receiving the luminous intensity from the sensor and controlling the pulse width modulator to provide a pulse width modulated voltage to the semiconductor light source from the voltage source based on the luminous intensity,
wherein the driver circuit lacks a sensing resistor for sensing current applied to the semiconductor light source.

17. The driver circuit as claimed in claim 16, wherein the controller controls the voltage source such that, when a duty cycle falls below or exceeds a duty cycle threshold value, the pulse width modulated voltage applied to the semiconductor light source from the voltage source is adjusted by the controller.

18. The driver circuit as claimed in claim 16, wherein the voltage source comprises a variable resistor or a field effect transistor controlled by the controller so as to provide the pulse width modulated voltage.

19. The driver circuit as claimed in claim 16, wherein the voltage source comprises an unregulated control element through which the voltage can be varied.

20. The driver circuit as claimed in claim 16, wherein the controller comprises a memory that stores a table of values representing a ratio of applied voltage and luminous intensity so that when raising or lowering the voltage applied to the semiconductor light source the controller can increase or decrease the duty cycle based on the table to keep the brightness essentially the same upon switching.

* * * * *